United States Patent
Asbeck et al.

(10) Patent No.: US 7,590,270 B2
(45) Date of Patent: Sep. 15, 2009

(54) METHOD AND APPARATUS FOR VISUALIZING DEPOSITS IN BLOOD VESSELS, PARTICULARLY IN CORONARY VESSELS

(75) Inventors: Christian Asbeck, Bamberg (DE); Daniel Rinck, Uttenreuth (DE); Michael Scheuering, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 503 days.

(21) Appl. No.: 11/190,807

(22) Filed: Jul. 28, 2005

(65) Prior Publication Data

US 2006/0023924 A1     Feb. 2, 2006

(30) Foreign Application Priority Data

Jul. 29, 2004     (DE) ................. 10 2004 036 726

(51) Int. Cl.
*G06K 9/00*     (2006.01)
(52) U.S. Cl. .................. 382/128; 382/130; 382/132
(58) Field of Classification Search ............. 382/128, 382/129, 130, 131, 132
See application file for complete search history.

(56) References Cited

U.S. PATENT DOCUMENTS

| | | | | |
|---|---|---|---|---|
| 6,104,948 | A * | 8/2000 | Bogart et al. | 600/524 |
| 6,690,816 | B2 * | 2/2004 | Aylward et al. | 382/128 |
| 6,862,029 | B1 * | 3/2005 | D'Souza et al. | 345/690 |
| 7,453,472 | B2 * | 11/2008 | Goede et al. | 345/634 |
| 2004/0146190 | A1 * | 7/2004 | Kasai | 382/128 |

OTHER PUBLICATIONS

S.A. de Winter et al.: "Computer Assisted Three-dimensional Plaque Characterization in Intracoronary Ultrasound Studies", In : Computers in Cardiology, 2003, vol. 30, p. 73-76.
K. Nikolaou et al.: "Evaluierung der Mehrzeilendetektorcomputertomographie zur Darstellung der koronaren Atherosklerose", In: Der Radiologe, 2004, vol. 44, No. 2, p. 130-139.
B.Ohnesorge et al.: "Cardiac Imaging by Means of Electrocardiographically Gated Multisection Spiral CT: Initial Experience". In: Radiology, 2000, vol. 217, p. 564-571.
C.R.Becker et al.: "Current development of cardiac imaging with multidetector-row CT". In: European Journal of Radiology, 2000. vol. 36, p. 97-103.
S.Schroeder et al.: "Noninvasive Detection and Evaluation of Atherosklerotic Coronary Plaques with Multislice Computed Tomography". In: Journal of the American College of Cardiology, 2001, vol. 37, No. 5, p. 1430-1435.
German Office Action dated Apr. 27, 2005.

* cited by examiner

*Primary Examiner*—John B Strege
(74) *Attorney, Agent, or Firm*—Harness, Dickey & Pierce, P.L.C.

(57) ABSTRACT

A method and an apparatus are disclosed for visualizing deposits in blood vessels, particularly in coronary vessels. In such a method, 2D slice images may be reconstructed from the measurement data, with image data of the 2D slice images being post-processed for local determination of brightness values and/or of default values on which these are based in the 2D slice images. In the presentation of the 2D slice images, one or more image areas are marked in which, in the post-processing, pixels are automatically color-coded and presented according to a predeterminable transfer function which assigns different colors to different value ranges of brightness values and/or of default values on which these are based.

19 Claims, 2 Drawing Sheets

METHOD AND APPARATUS FOR VISUALIZING DEPOSITS IN BLOOD VESSELS, PARTICULARLY IN CORONARY VESSELS

The present application hereby claims priority under 35 U.S.C. §119 on German patent application number DE 10 2004 036 726.4 filed Jul. 29, 2004, the entire contents of which is hereby incorporated herein by reference.

FIELD

The present invention generally relates to a method and/or an apparatus for visualizing deposits in blood vessels, particularly in coronary vessels, in which an imaging tomographic machine, in particular a multi-slice computed tomography machine, is used to record measurement data. In particular, it is for recording measurement data for a sequence of 2D slice images of the blood vessels, and the 2D slice images are reconstructed from the measurement data and presented, with image data of the 2D slice images being post-processed for local determination of brightness values and/or of default values on which these are based.

BACKGROUND

Coronary heart diseases are one of the main causes of death in the industrialized world. They are often triggered by atherosclerotic plaque which gathers in the coronary vessels and which can lead to narrowing or occlusion of the vessels. Atherosclerotic plaque can be divided into various types with different compositions.

Lipid-rich or noncalcified plaque, also referred to as soft plaque, is associated with a particularly high risk of a coronary event such as an infarct or sudden cardiac death, because its rupture most likely leads to an acute vascular occlusion. In cases where soft plaque is present, the risk of an acute coronary event can be reduced by using certain medicines called lipid-lowering agents. In contrast to soft plaque, another type of plaque called calcified plaque more rarely causes acute vascular occlusions. The same applies to fibrous plaque, an intermediate stage between soft plaque and calcified plaque.

When using imaging techniques, it is therefore of advantage to be able to detect the presence of soft plaque in the patient's coronary vessels as quickly as possible. Known imaging methods for visualizing soft plaque in coronary vessels are the invasive imaging methods of intravascular ultrasound imaging (IVUS) or optical coherence tomography (OCT). These imaging techniques generate gray-scale images whose image plane is oriented perpendicular to the vessel axis. The vessel can be seen as a concentric ring in the center of the image, and different plaque types can be pinpointed by different gray-scale scale areas in the image. However, the observer must have considerable experience to reliably detect the presence of plaque and to be able to differentiate between the different types of plaque.

Since the introduction of multi-slice computed tomography machines, which can record four or more slices simultaneously by way of a suitable detector array, noninvasive imaging of the heart is also possible in conjunction with electrocardiographically synchronized operation (ECG gating). ECG gating, in conjunction with the high recording speed of a multi-slice computed tomography machine, permits visualization of the coronary arteries with minimal movement artifacts. The recorded 2D slice images can then be visualized in different ways, for example by 3D volume rendering (VRT) or by two-dimensional thin-slice MIP (maximal intensity projection).

Examples of tomographic imaging of this kind can be found in the publication by B. Ohnesorge et al., "Cardiac Imaging by Means of Electrocardiographically Gated Multi-section Spiral CT: Initial Experience", Radiology (2002), volume 217, pages 564-571. As is set forth in the publication by C. R. Becker et al., "Current Development of Cardiac Imaging with Multidetector-Row CT", European Journal of Radiology (2000), volume 36, pages 97-103, calcified and noncalcified coronary plaque can also be presented using multi-slice computed tomography on the basis of approximately isotropic slice image data sets. From S. Schröder et al., "Non-invasive Detection and Evaluation of Atherosclerotic Plaque with Multi-Slice Computed Tomography", Journal of the American College of Cardiology (2001), volume 37, pages 1430-1435, a method for visualizing deposits in coronary vessels is known in which lipid-rich, fibrous and calcified plaque can be differentiated by determining the CT density values in the image data of the reconstructed 2D slice images. In this method, density measurements are carried out at 16 randomly selected points in at least 4 different axial slice images of each area of plaque.

However, when viewing the 2D slice images of the examined area which have been obtained with the imaging tomographic technique, a problem which often arises is that of the poor level of detection of the different types of plaque in relation to the surrounding tissue.

SUMMARY

An object of at least one embodiment of the present invention is to make available a method and/or an apparatus for visualizing deposits in blood vessels, particularly in coronary vessels, with which different types of deposits can be more easily detected by the viewer.

In the method of at least one embodiment for visualizing deposits in blood vessels, an imaging tomographic machine, in particular a multi-slice computed tomography machine, is used to record measurement data for a sequence of 2D slice images of the blood vessels. The 2D slice images are reconstructed from the measurement data and presented. In the presentation of the 2D slice images, one or more image areas are marked, for example interactively. The image areas, in particular vessel areas, can also be automatically established using an image-processing method. In the marked image areas, in automatic post-processing, pixels are color-coded and presented in the 2D slice images according to a predeterminable transfer function which assigns different colors to different value ranges of brightness values and/or of default values on which these are based.

When viewing the recorded 2D slice images of the blood vessels, the viewer, using a suitable interactive marking device, for example a mouse pointer, interactively marks areas of interest in the presented 2D slice images of the presented blood vessels. The marking can be done using a so-called pixel lens technique in which a predetermined surface area around the position of the mouse pointer is viewed as a marked image area. All the pixels within this marked image area are each presented in color according to the predetermined transfer function.

The associated post-processing of the image data and the color presentation can be triggered either simply by positioning the mouse pointer on an image area or by entering a command, for example a mouse click. The predetermined surface area around the position of the mouse pointer can be circular, elliptic or rectangular, and can of course also have any other predeterminable shapes. With this colored pixel lens, it is possible for the viewer, when analyzing the images, to immediately visually identify plaque on the blood vessels in the image and to detect its shape and extent. By interactive navigation in the images, it is possible to gain a rapid overview of the extent and nature of the plaque in the examined object volume.

A further advantageous possibility of predetermining corresponding image areas for the color coding lies in the use of a drawing tool with which these image areas in the images are marked. This too can be done in a known manner with the aid of the mouse pointer and a graphics program. By way of a double click on the marked areas, the post-processing is then triggered, followed by the color presentation in accordance with the transfer function. In this embodiment, it is also possible for all the plaque areas present in the images to be marked by the drawing tool.

In a further development of this embodiment, the plaque is quantitatively determined on the basis of the marked areas. The total volume of all the plaque present or of individual plaque types, in particular soft plaque, can be calculated. The three-dimensional volume of this plaque can be determined via a three-dimensional adaptation model between the individual slice images. In this case, it is also possible to calculate the proportion of individual plaque types in the total plaque and to present the result. In this way, the viewer immediately recognizes whether the plaque present is composed principally of one type of plaque.

The imaging tomographic machine for recording the measurement data can, for example, be a computed tomography machine, a C-arc machine, an NMR tomography machine or an ultrasonic tomography machine. The important aspect of using the method is simply that the imaging technique allows image data to be obtained with which different types of plaque can be differentiated by different brightness values in the image. In an example embodiment of the present method, however, the measurement data are recorded using a multi-slice computed tomography machine.

In taking images of vessels of the heart, the technique of ECG gating is employed here in order to obtain volumetric data sets with an isotropic submillimeter resolution without movement artifacts. The sequence of 2D slice images generally comprises several 100 axial 2D slice images. With special processing methods, it is possible to obtain these images in each case perpendicular to the vessel axis of the blood vessels in question, with a predeterminable distance being maintained between the individual images.

For an overview of all the plaque areas present, it is necessary to reconstruct 2D slice images which as far as possible include all the blood vessels. In an example embodiment of the present method, the technique of thick multiplanar reformation (thick MPR) can be used to obtain overlapping images and thus an increased reproducibility by elimination of the distances between adjacent images. However, the thickness of the slices of the individual slice images should not be chosen so great that the resolution along the coronary arteries is thereby reduced. In carrying out the method of at least one example embodiment, it is of course also possible to add contrast medium in order to heighten the image contrast in respect of the plaque areas of interest.

When using a computed tomography machine, a differentiation between the different types of plaque may be effected on the basis of the CT number. In this connection, a division into the following classes may be made:

noncalcified or lipid plaque, if the CT number lies within a first interval, fibrous plaque, if the CT number lies within a second interval, vessel lumen, if the CT number lies within a third interval, and calcified plaque, if the CT number lies within a fourth interval.

This classification by intervals is transposed into the transfer function which codes the pixels of the marked image areas falling into the individual intervals with a color assigned to one of the intervals.

An example embodiment of at least one apparatus for carrying out the method includes an imaging tomographic machine, in particular a multi-slice computed tomography machine, for recording measurement data for a sequence of 2D slice images of the blood vessels, an image computer for reconstruction of the 2D slice images from the measurement data and for presentation of the 2D slice images on a display unit, and a post-processing module for local determination of brightness values and/or of default values on which these are based in the 2D slice images. The post-processing module, which is preferably integrated in the image computer, permits interactive marking of one or more image areas in the presentation of the 2D slice images and is designed for automatic color coding and presentation of pixels in the marked image areas according to a predeterminable transfer function which assigns different colors to different value ranges of brightness values and/or of default values on which these are based. The post-processing module thus also includes an interaction module which records the marking areas input via a graphic user interface by a person viewing the original 2D slice images and uses these as a basis for the post-processing.

BRIEF DESCRIPTION OF THE DRAWINGS

The present method is again briefly explained below on the basis of illustrative embodiments and in connection with the drawings, in which.

DETAILED DESCRIPTION OF THE EXAMPLE EMBODIMENTS

Figure 1:
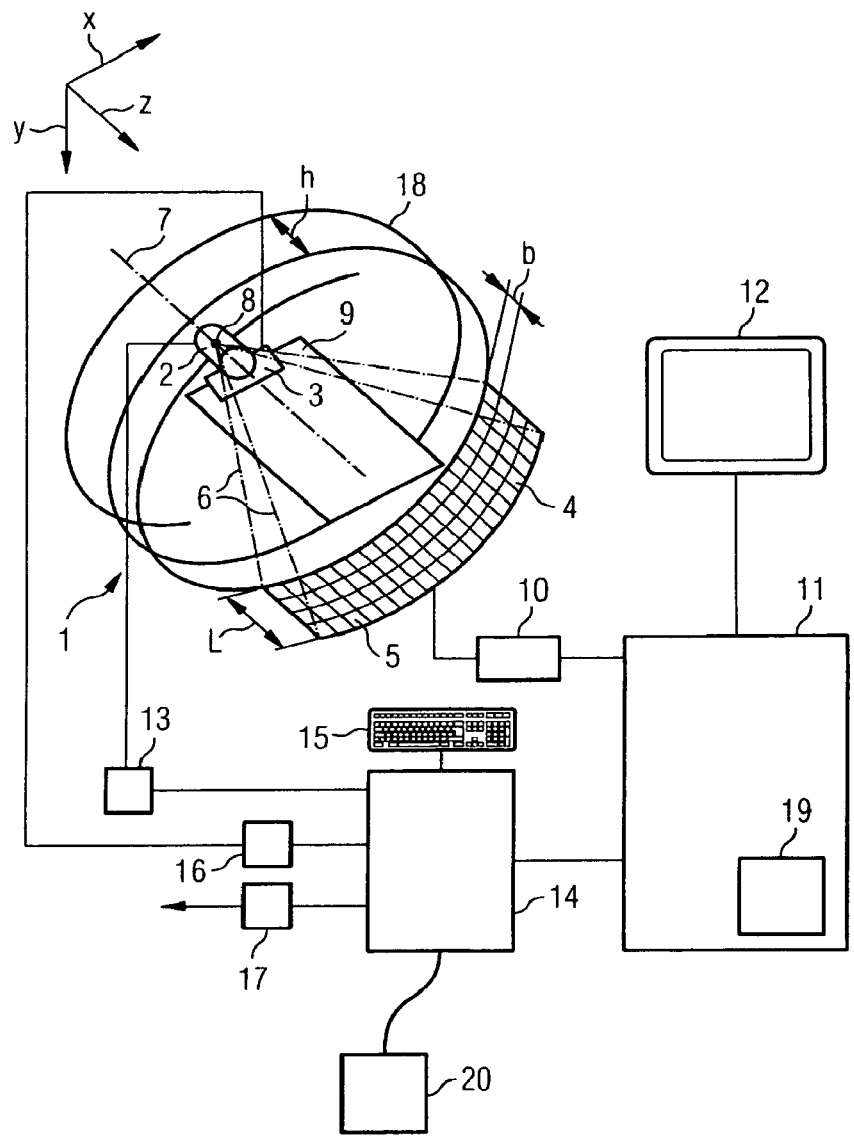
FIG. 1 shows, in a diagrammatic representation, an example of a multi-slice computed tomography machine for carrying out an embodiment of the method.

A third-generation multi-slice computed tomography machine 1 is illustrated diagrammatically in FIG. 1. Its measuring equipment includes an X-ray emitter 2 with an insertion device 3 in front thereof and near the source, and an X-ray detector 5 designed as a multi-row or planar array of several rows and columns of detector elements 4. For the sake of clarity, only four rows of detector elements 4 are illustrated in the view in FIG. 1. However, the X-ray detector can have further rows of detector elements 4, also with a different width b.

The X-ray emitter 2 with the insertion device 3, on the one hand, and the X-ray detector 5 with its radiation diaphragm (not shown), on the other hand, are fitted on a rotary frame situated opposite one another in such a way that a pyramidal X-ray beam that emanates from the X-ray emitter 2 during operation of the computed tomography machine 1 and is inserted by the adjustable insertion device 3, and whose edge rays are designated in FIG. 1 by reference number 6, strikes the X-ray detector 5. The rotary frame can be set in rotation about a system axis 7 by means of a drive device (not shown).

The system axis 7 runs parallel to the z-axis of a three-dimensional rectangular coordinate system illustrated in FIG. 1. The columns of the X-ray detector 5 likewise run in the direction of the z-axis, while the rows, whose width b is measured in the direction of the z-axis and is, for example, 1 mm, run transverse to the system axis 7 or the z-axis.

In order to be able to bring the examination object, the patient, into the beam path of the X-ray beam, a supporting device 9 is provided that can be displaced parallel to the system axis 7, that is to say in the direction of the z-axis. The displacement is effected in such a way that there is synchronization between the rotation movement of the rotary frame and the translation movement of the supporting device 9, it being possible to set the ratio of speed of translation to rotation speed by prescribing a desired value for the advance h of the supporting device 9 per revolution of the rotary frame.

An object volume of a patient situated on the supporting device 9 can be examined by way of volumetric scanning by operating this computed tomography machine 1. In the case of spiral scanning, many projections can be recorded from various projection directions during rotation of the rotary frame and simultaneous translation of the supporting device 9 per revolution of the rotary frame. In the case of spiral scanning, the focus 8 of the X-ray emitter 2 moves relative to the supporting device 9 on a spiral trajectory 18. Sequence scanning is also possible as an alternative to this spiral scanning.

The measurement data, which are read out in parallel during spiral scanning from the detector elements 4 of each active row of the detector system 5 and correspond to the individual projections, are subjected to analog-to-digital conversion in a data conditioning unit 10, serialized, and transmitted as raw data to an image computer 11 which presents the result of image reconstruction on the display unit 12, for example a video monitor.

The X-ray emitter 2, for example an X-ray tube, is supplied with the necessary voltages and currents by a generator unit 13. In order to be able to set these to the values respectively required, the generator unit 13 is assigned a control unit 14 with a keyboard 15 which permits the appropriate settings. The remaining operation and control of the computed tomography machine 1 is also performed by way of the control unit 14 and the keyboard 15. It is possible, inter alia, to set the number of the active rows of detector elements 4, and thus the position of the insertion device 3 and of the optional radiation diaphragm, close to the detector, for which purpose the control unit 14 is connected to adjusting units 16, 17 assigned to the insertion device 3 and the optional radiation diaphragm close to the detector. Furthermore, it is possible to set the rotation time required by the rotary frame for a complete revolution.

In ECG-synchronized image processing, only those of the 2D slice images recorded with the computed tomography machine 1 are presented which correspond to the same cardiac phase of the patient. The ECG signals from a ECG measurement device 20 connected to the control device 14 are for this purpose recorded in parallel with the data recording. By this retrospective ECG gating, images of the coronary vessel system can be obtained which are free from movement artifacts caused by the movement of the heart. As regards the retrospective ECG gating with existing multi-slice computed tomography machines, reference is made to the publications mentioned in the introduction, the content of which publications is expressly included in the present patent application.

Figure 3:
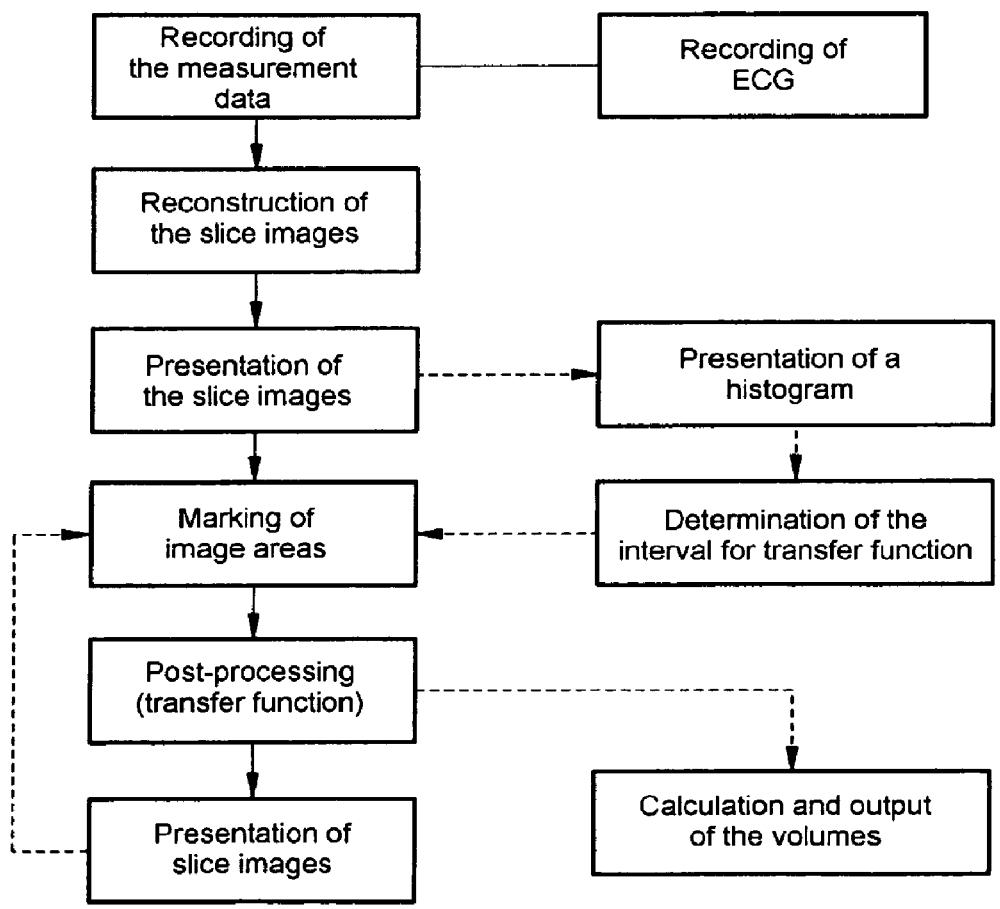
FIG. 3 shows an overview of the method steps involved in carrying out an embodiment of the present method.

In carrying out at least one embodiment of the method, the measurement data are first recorded with the computed tomography machine 1, with simultaneous recording of an ECG. The sequence of an embodiment of the method is outlined in FIG. 3. From the measurement data obtained, a reconstruction of the 2D slice images is performed in the image computer 11, only those images being reconstructed, and then presented on the monitor 12, which were recorded in the same cardiac phase of the patient (retrospective ECG gating).

In this image presentation, the user employs a graphic input instrument, for example a computer mouse, to mark an image area which is subsequently post-processed in a specially configured post-processing module 19 of the image computer 11. In this post-processing, the pixels in this image area whose brightness values are obtained from CT numbers are assigned to different intervals of the CT numbers.

A first interval from −50 HU to +50 HU here corresponds to noncalcified plaque, a second interval of between 50 HU and 150 HU corresponds to fibrous plaque, a third interval of between 150 HU and 300 HU corresponds to the vessel lumen, and a fourth interval of between 300 HU and 1000 HU corresponds to calcified plaque. By use of a transfer function configured for this purpose, an interval-specific color is in each case assigned to the pixels according to the interval into which they fall by virtue of their CT value. Thus, for example, all pixels falling into the first interval can be coded with the color red.

In the same way, pixels which fall into the other intervals are coded with other colors. After this post-processing, the whole 2D slice image is presented, the coloring obtained via the post-processing being indicated in the marked area. From this presentation, the viewer can then immediately detect the presence of plaque and differentiate between the individual types of plaque on the basis of the different colors. The ratio of the individual types of plaque to one another and to the total extent of the plaque in the marked area is also immediately apparent.

Figure 2A:
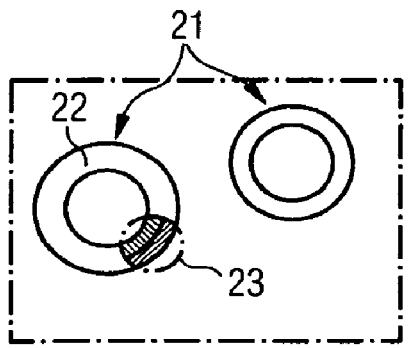
FIG. 2 shows an example of the color-coded visualizing with the aid of a pixel lens or a drawing tool.

FIG. 2a shows a very schematic representation of an example of the color-coded presentation of a marked area using a so-called pixel lens. The figure shows a detail from a 2D slice image in which two vessels 21 can be seen in axial section. By positioning the mouse pointer on a vessel wall 22 of one of the vessels, a circular area 23 around the mouse pointer is automatically marked which represents the pixel lens.

In this area, the post-processing is carried out, followed by the color-coded presentation of the pixels according to the assigned types of plaque. This is indicated in the figure by the use of the different shades of hatching in this area. By moving the mouse pointer within the image, the viewer can thus search for critical plaque types and areas of the vessels.

The same procedure can of course also take place in all the recorded slice images through which the viewer is able to navigate, for example in the image presentation. The pixel lens shown in FIG. 2a can of course have any predeterminable dimensions, for example from 3×3 pixels up to 10×10 or more pixels. The geometric shape of the lens can also be freely chosen.

Figure 2B:
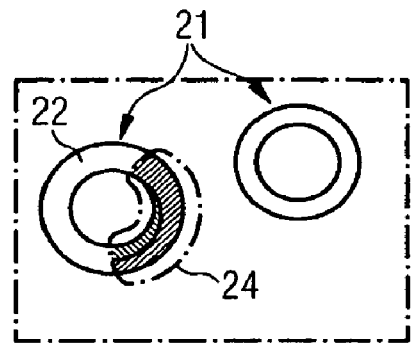

FIG. 2b shows an example in which the viewer has marked an area 24 inside the 2D slice image using a graphic drawing tool. By way of an input command, for example a mouse click on the closed area 24 drawn by the viewer, the post-processing and color-coded image presentation then take place in the same way as has already been explained in connection with FIG. 2a. When plaque areas in several successive 2D slice images have been marked, it is also possible, by way of a suitable input command, to automatically calculate the total volume of the marked plaque or of a certain type of plaque and output the result. The ratios of the volumes of the individual plaque types to one another, or to the total volume of the plaque present in the marked area, can also be output in this way. In the module for post-processing, from the successive slice images in which the areas are marked, a volume of the marked area is formed and volumes of the plaque types contained therein are calculated.

In an advantageous embodiment of the method, the transfer function can also be changed interactively, in particular the interval limits can be altered or the number of intervals increased or reduced. For this purpose, the user is preferably provided with a histogram of the presented image in which he can prescribe the individual interval limits of the transfer function for the different colors.

With at least one embodiment of the proposed method and/or at least one embodiment of the associated apparatus, it is possible for the user to detect and quantify plaque in vessel structures in a manner which is rapid and noninvasive. The color coding of different types of plaque is effected according to a user-defined, predeterminable transfer function. The total amount of plaque present in the patient can be automatically calculated, by marking all the areas affected by plaque in the 2D slice images, and then output.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for visualizing deposits in blood vessels, comprising:
   reconstructing two-dimensional (2D) slice images from measurement data for a sequence of 2D slice images of the blood vessels, with image data of the 2D slice images being post-processed for local determination of at least one of brightness values and default values on which these are based in the 2D slice images;
   marking one or more image areas, after presentation of the 2D slice images, by positioning a marking element which is interactively shiftable in the 2D slice images and around which a predeterminable marking area is defined; and
   automatically color-coding and presenting pixels of the image areas, in the post-processing, according to a predeterminable transfer function which assigns different colors to different value ranges of at least one of brightness values and default values on which the brightness values are based.

2. The method as claimed in claim 1, wherein the transfer function is chosen such that different types of at least one of deposits and tissue are displayed in different colors.

3. The method as claimed In claim 2, wherein, from a marking of superposed image areas in spatially successive 2D slice images, a three-dimensional area is automatically formed and a volume of the total at least one of the deposits and tissue of a defined type in the three-dimensional area is calculated and supplied as a value.

4. The method as claimed in claim 3, wherein one or more relationships of calculated volumes of at least one of different types of deposits and tissues and the volume of the total deposits are calculated and presented as values.

5. The method as claimed in claim 1, wherein the 2D slice images are reconstructed and presented in such a way that an image plane of the 2D slice images is substantially perpendicular to a longitudinal axis of the presented blood vessels.

6. The method as claimed in claim 1, wherein, for an interactive setting of the value ranges for the transfer function, a histogram of the brightness values contained in the 2D slice images is displayed.

7. The method as claimed in claim 1, further comprising:
   recording the measurement data for a sequence of 2D slice images of the blood vessels using an imaging tomographic machine, wherein the recording of the measurement data takes place with simultaneous recording of an electrocardiogram, and the 2D slice images are reconstructed using the technique of retrospective EGG synchronization.

8. The method as claimed in claim 7, wherein the recording of the measurement data takes place using a multi-slice computed tomography machine.

9. An apparatus for visualizing deposits in blood vessels, comprising:
   an imaging tomographic machine for recording measurement data for a sequence of 2D slice images of the blood vessels;
   an image computer for reconstruction of two-dimensional (2D) slice images from the measurement data and for presentation of the 2D slice images on a display unit; and
   a post-processing module for local determination of at least one of brightness values and default values based on the 2D slice Images, the post-processing module permitting marking of one or more image areas after the presentation of the 2D slice images by positioning of a marking element, interactively shiftable in the 2D slice images and around which a predeterminable marking area is defined, and being designed for automatic color coding and presentation of pixels in the marked image areas according to a predeterminable transfer function which assigns different colors to different value ranges of at least one of brightness values and default values on which the brightness values are based.

10. The apparatus as claimed in claim 9, wherein the post-processing module is integrated in the image computer.

11. An apparatus for carrying out the method according to claim 2.

12. The apparatus as claimed in claim 9, wherein the imaging tomographic machine for retrospective EGG synchronization is connected to an appliance for recording an electrocardiogram.

13. The apparatus as claimed in claim 9, wherein the imaging tomographic machine is a multi-slice computed tomography machine.

14. The method as claimed in claim 1, further comprising:
   recording the measurement data for a sequence of 2D slice images of the blood vessels using an imaging tomographic machine.

15. The method as claimed in claim 2, wherein the 2D slice images are reconstructed and presented in such a way that an image plane of the 2D slice images is substantially perpendicular to a longitudinal axis of the presented blood vessels.

16. The method as claimed in claim 2, wherein, for an interactive setting of the value ranges for the transfer function, a histogram of the brightness values contained in the 2D slice images is displayed.

17. The method as claimed in claim 2, further comprising:
   recording the measurement data for a sequence of 2D slice images of the blood vessels using an imaging tomographic machine, wherein the recording of the measurement data takes place with simultaneous recording of an electrocardiogram, and the 2D slice images are reconstructed using the technique of retrospective ECG synchronization.

18. An apparatus for visualizing deposits in blood vessels, comprising:
   means for reconstructing two-dimensional (2D) slice images from measurement data for a sequence of 2D slice images of the blood vessels, with image data of the 2D slice images being post-processed for local determination of at least one of brightness values and default values on which these are based in the 2D slice images;

means for marking one or more image areas, after presentation of the 2D slice images, by positioning a marking element which is interactively shiftable in the 2D slice images and around which a predeterminable marking area is defined; and means for automatically color-coding and presenting pixels of the image areas, in the post-processing, according to a predeterminable transfer function which assigns different colors to different value ranges of at least one of brightness values and default values on which the brightness values are based.

19. The apparatus as claimed in claim 18, further comprising:

means for recording the measurement data for a sequence of 2D slice images of the blood vessels using an imaging tomographic machine.

\* \* \* \* \*